United States Patent
Hewett et al.

(10) Patent No.: US 6,785,691 B1
(45) Date of Patent: Aug. 31, 2004

(54) OBJECT ORIENTED PROCESSING SYSTEM AND DATA SHARING ENVIRONMENT FOR APPLICATIONS THEREIN

(75) Inventors: Alan Perry Hewett, Pataskala, OH (US); Steven Andrew Lopez, Columbus, OH (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/416,987

(22) Filed: Oct. 13, 1999

(51) Int. Cl.[7] .................................................. G06F 7/00
(52) U.S. Cl. ............................. 707/103; 707/1; 707/8; 707/201; 707/10
(58) Field of Search ............................. 707/1, 2, 103, 707/8, 10; 709/201, 203; 711/121, 122; 717/103

(56) References Cited

U.S. PATENT DOCUMENTS

| | | | | |
|---|---|---|---|---|
| 5,875,461 A | * | 2/1999 | Lindholm | 711/118 |
| 5,884,097 A | * | 3/1999 | Li et al. | 710/43 |
| 5,924,098 A | * | 7/1999 | Kluge | 707/100 |
| 5,943,496 A | * | 8/1999 | Li et al. | 709/328 |
| 6,108,754 A | * | 8/2000 | Lindholm | 711/122 |
| 6,134,603 A | * | 10/2000 | Jones et al. | 709/330 |
| 6,154,747 A | * | 11/2000 | Hunt | 707/100 |
| 6,237,043 B1 | * | 5/2001 | Brown et al. | 709/316 |
| 6,256,637 B1 | * | 7/2001 | Venkatesh et al. | 707/103 Y |
| 6,266,716 B1 | * | 7/2001 | Wilson et al. | 710/33 |
| 6,345,313 B1 | * | 2/2002 | Lindholm | 709/315 |
| 6,453,460 B1 | * | 9/2002 | Keyes | 717/108 |

\* cited by examiner

*Primary Examiner*—Greta Robinson
*Assistant Examiner*—Miranda Le
(74) *Attorney, Agent, or Firm*—David Volejnicek

(57) ABSTRACT

A global data sharing environment and data sharing proxy agent for multiple application instances in an object oriented processing system are disclosed. In response to an object in an application instance calling a data storage method, a local data sharing environment is generated that corresponds to the requesting object's application instance. As a data storage or retrieval method is processed, data is stored in or retrieved from the local data sharing environment. Data can also be shared between objects in separate application instances using the global data sharing environment.

28 Claims, 6 Drawing Sheets

OBJECT ORIENTED PROCESSING SYSTEM AND DATA SHARING ENVIRONMENT FOR APPLICATIONS THEREIN

BACKGROUND OF THE INVENTION

1. Field of the Invention

This invention relates to a system and method for passing data from one object to another within an application in an object oriented processing system running multiple instances of the application.

2. Description of the Prior Art

In an object oriented processing system based on an object oriented language such as Java, C++ and the like, an "application" is a collection of one or more instances of objects that perform a specific function or task and an application "instance" is one specific and independent case or request for an application's functions comprising one set of the application's object instances typically running in an assigned thread of execution. Data can be passed from one object to another object within an application via arguments to methods associated with the individual objects that comprise the application. This method of data passing has the difficult requirement that cooperating objects have advance knowledge of all the data that a called object will need, as well as all the data that will be needed by any object that works with the called object.

A second method for sharing data among objects in an object oriented processing system is the Java InfoBus API. The InfoBus API facilitates data communication between objects cooperating in the same Java Virtual Machine (JVM). Using the notion of a "bus," the InfoBus API allows objects that implement it to "plug into" the bus. Any "plugged in" member of the bus can exchange information with any other member in a structured way. The downside of sharing data through the InfoBus API is the lack of data persistence. Because the bus structure does not retain the data after its transmission, the data cannot be referenced at some later time.

A third method for providing data to remote objects (i.e., ones not called directly) is to place them in a shared location. By way of example, in a Java-based object oriented processing system, the JVM executes the series of objects that comprise one or more Java applications. A static hash table can be defined that allows the application objects to store and retrieve data using hash table "key" identifiers. Defining a static hash table to provide for storage and retrieval of data is desirable because the key identifiers and values of key identifiers are unknown to objects at compile time.

This method works well when only one instance of the application is executing in the JVM. However, it is often desirable to run multiple instances of the same application in multiple thread groups. For example, running multiple instances of an application simultaneously in an object oriented environment can be used to advantage in a telephone call center. Multiple incoming calls at the call center require simultaneous processing. This processing can be implemented by spawning new application instances as new calls arrive. The processing of multiple calls thus results in the simultaneous execution of multiple instances of the same application. A problem arises relative to data sharing in this situation because each application instance cannot have its own static hash table. A static hash table is a "class" variable such that only one such table can reside within the JVM. Nor can multiple instances of an application running within a single JVM use the same static hash table to store local copies of data. Each application may require the placement of different information in the hash table and such storage in a single hash table might lead to data collisions.

Accordingly, there is a need in an object oriented computing environment for a system and method that allows multiple instances of applications to run simultaneously, with each spawned application instance having reliable access to its data. What is required is a system and method for providing an environment of variables and objects that are local to an application, and segregated from other applications running simultaneously therewith. (As used in this patent application, "variable" is not limited to simple String or Integer values; rather, it refers to a specific instance of any object in an object oriented processing system.)

SUMMARY OF THE INVENTION

A system and method in accordance with the invention provides a global data sharing environment and data sharing proxy agent for multiple application instances in an object oriented processing system. In response to an object in an application instance calling a data storage or retrieval method for sharing data with other objects, the data is transparently stored in or retrieved from a local data sharing environment that corresponds to the requesting object's application instance and is managed by the proxy agent within the global data sharing environment. The data sharing environment provides a "store" where data to be shared persists until it is changed or deleted, or until the supporting JVM terminates.

In preferred embodiments of the invention, local data sharing environments are implemented by creating, for each application instance, a local hash table that stores or references the data to be shared among the objects of that application instance. These data or data references are keyed by data identifiers maintained in the key indexes of the local hash tables. The preferred implementation of the global data sharing environment includes a global hash table that stores or references the local hash tables. These local hash tables or hash table references are keyed by application instance identifiers. When an object in an application instance wishes to store data in or retrieve data from its local hash table, it issues a data sharing request using one of its local hash table data identifier keys. The proxy agent operating in the global data sharing environment processes the data sharing request by determining the application instance identifier corresponding to the application instance holding the object that made the data sharing request. The proxy agent queries the global hash table using the application instance identifier as a key to identify the local hash table that corresponds to the application instance to which the requesting object belongs. The proxy agent completes the data sharing transaction by querying the local hash table identified by the global hash table query using the data identifier provided by the requesting object as the key.

BRIEF DESCRIPTION OF THE DRAWING

The foregoing and other features and advantages of the invention will be apparent from the following more particular description of a preferred embodiment of the invention, as illustrated in the accompanying Drawing, in which.

DETAILED DESCRIPTION OF THE PREFERRED EMBODIMENT

Figure 1:
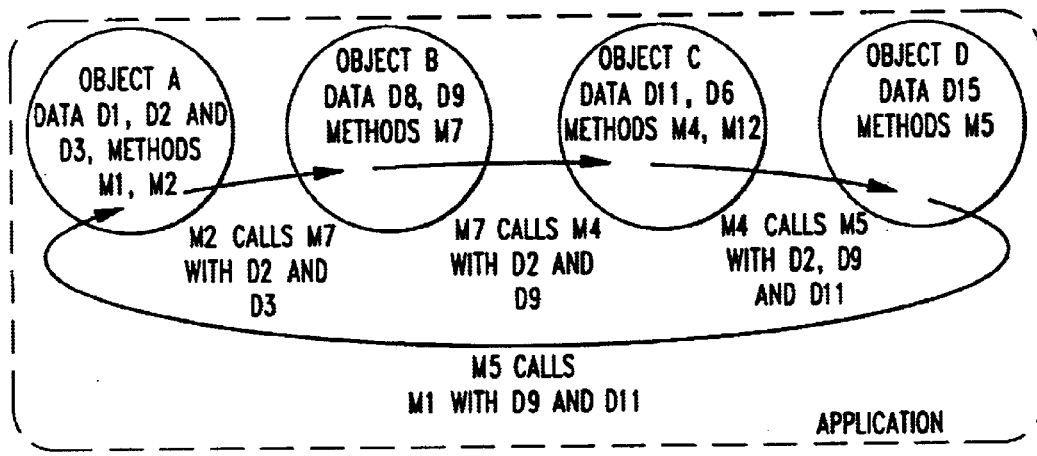
FIG. 1 is a block diagram showing a first scheme for sharing data among objects of an application object group in a prior art object oriented processing system.
Figure 2:
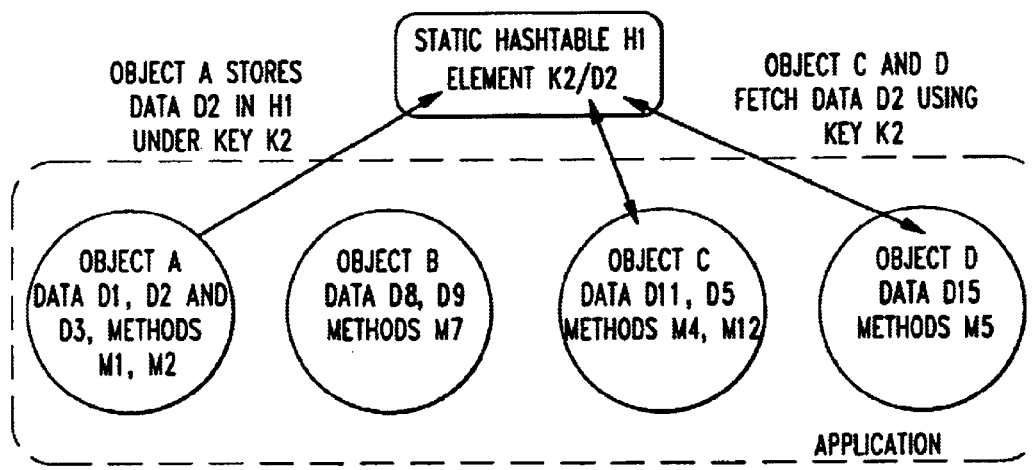
FIG. 2 is a block diagram showing a second scheme for sharing data among objects of an application object group in a prior art object oriented processing system.

Turning now to the figures, wherein like reference numerals represent like elements in all of the several views, FIGS. 1 and 2 illustrate, by way of additional background, the prior art data sharing schemes described above wherein data is passed from object to object, as shown in FIG. 1, or placed in a static hash table, as shown in FIG. 2. More particularly, in the sharing scheme of FIG. 1, objects A, B, C and D are part of an application in an object oriented computing environment such as a JVM. Data item D2 residing in object A is passed directly to object B by means of an argument in a call to method M7. Data item D2 is then passed to remote objects C and D by means of arguments in calls to methods M4 and M5, respectively. Similarly, data item D9, residing in object B, is passed to objects C, D and A via the calls to methods M4, M5 and M1, respectively. Likewise, data item D11 is passed to objects D and A via the calls to methods M5 and M1.

In the sharing scheme of FIG. 2, objects A, B, C and D comprise an application in an object oriented computing environment, and specifically a JVM. The static hash table H resides outside an application that includes objects A, B, C and D. The hash table H1 provides a key-based storage and retrieval mechanism for the data items in each of the objects, as described above by way of background. As FIG. 2 illustrates, object A stores data item D2 in the static hash table H1 under key K2. Data item D2 is shared with remote objects C and D when those objects retrieve D2 from H1 using key K2.

Figure 3:
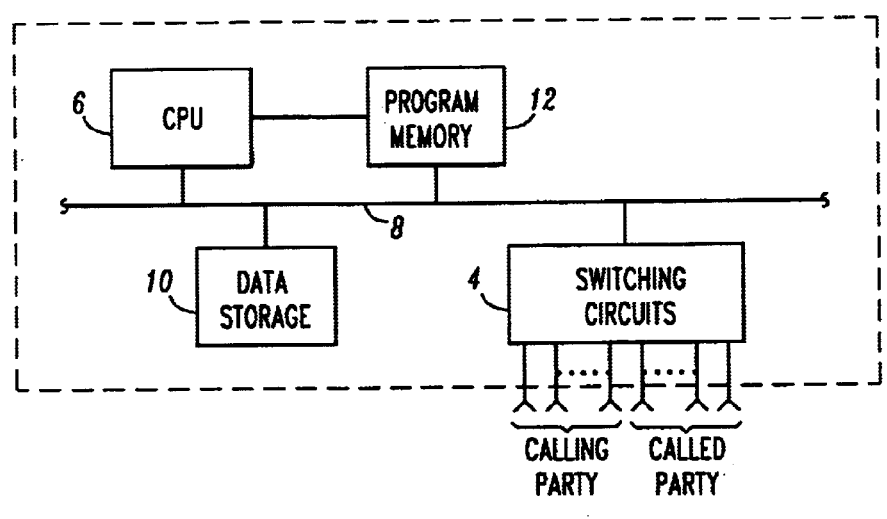
FIG. 3 is a block diagram showing an object oriented processing system constructed in accordance with a preferred embodiment of the invention.

Turning now to FIG. 3, an exemplary object oriented processing system 2 illustrates one possible implementation of the present invention in a telephone call processing center. As is known in the art, a call processing center provides automated call handling services in response to incoming calls to an enterprise such as a business, a governmental agency or other entity. As shown in FIG. 3, the processing system 2 includes switching circuits 4 for receiving calls from a calling party and routing those calls to an appropriate called destination, such as a telephone, a voice mail system, or the like. Program execution is provided by a central processing unit (CPU) 6 communicating over a shared bus 8 with a data storage medium 10, along with program memory 12 for use during program execution. Call processing functionality is provided by an object oriented software environment that runs on the processing system 2. In operation, the call center processes each menu-driven call by creating an application instance with storage for call-related data. As each call is processed, the objects within each application instance store and retrieve data using a novel data sharing "environment." These application instances and data storage and retrieval mechanisms are described in more detail below.

Figure 4:
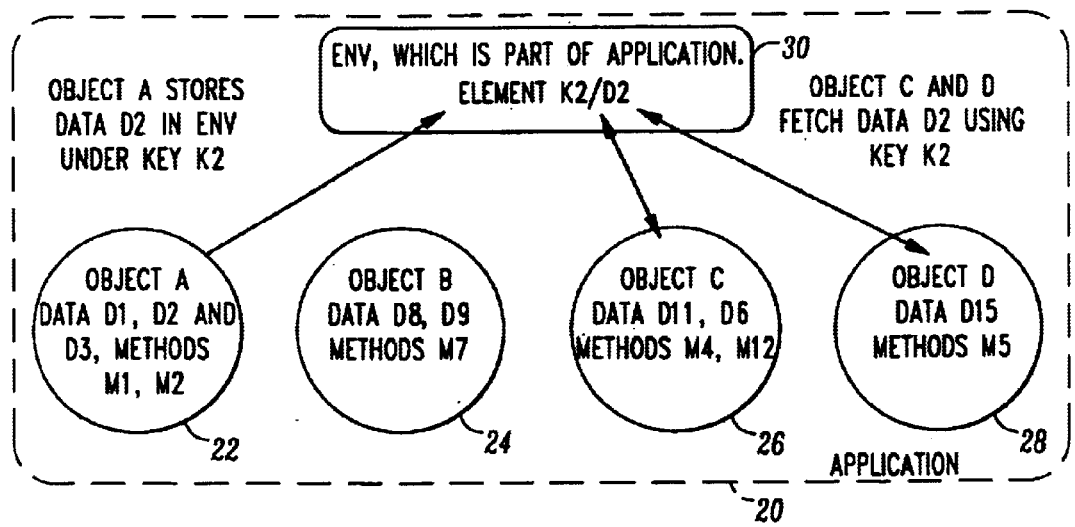
FIG. 4 is a block diagram showing a local data sharing environment for a spawned application instance object group in the object oriented processing system of FIG. 3.

Turning now to FIG. 4, an application instance 20 running in the object oriented processing system 2 is shown as including objects A, B, C and D, referenced by numerals 22, 24, 26 and 28, respectively. As is known in the art, these objects contain both data and methods. Logically associated with the application instance 20 is an instantiated hash table object 30, which is of class Env (described below). The hash table 30 is a key-based data storage and retrieval structure that provides a local environment that can be used by the objects A through D to share data within the application instance 20. In the example shown in FIG. 4, object A stores data item D2 (or a reference thereto) in the Env hash table 30, where it is associated with a key K2. This data is then shared when objects C and D retrieve the data item D2 from the hash table 30 using the key K2.

Figure 5:
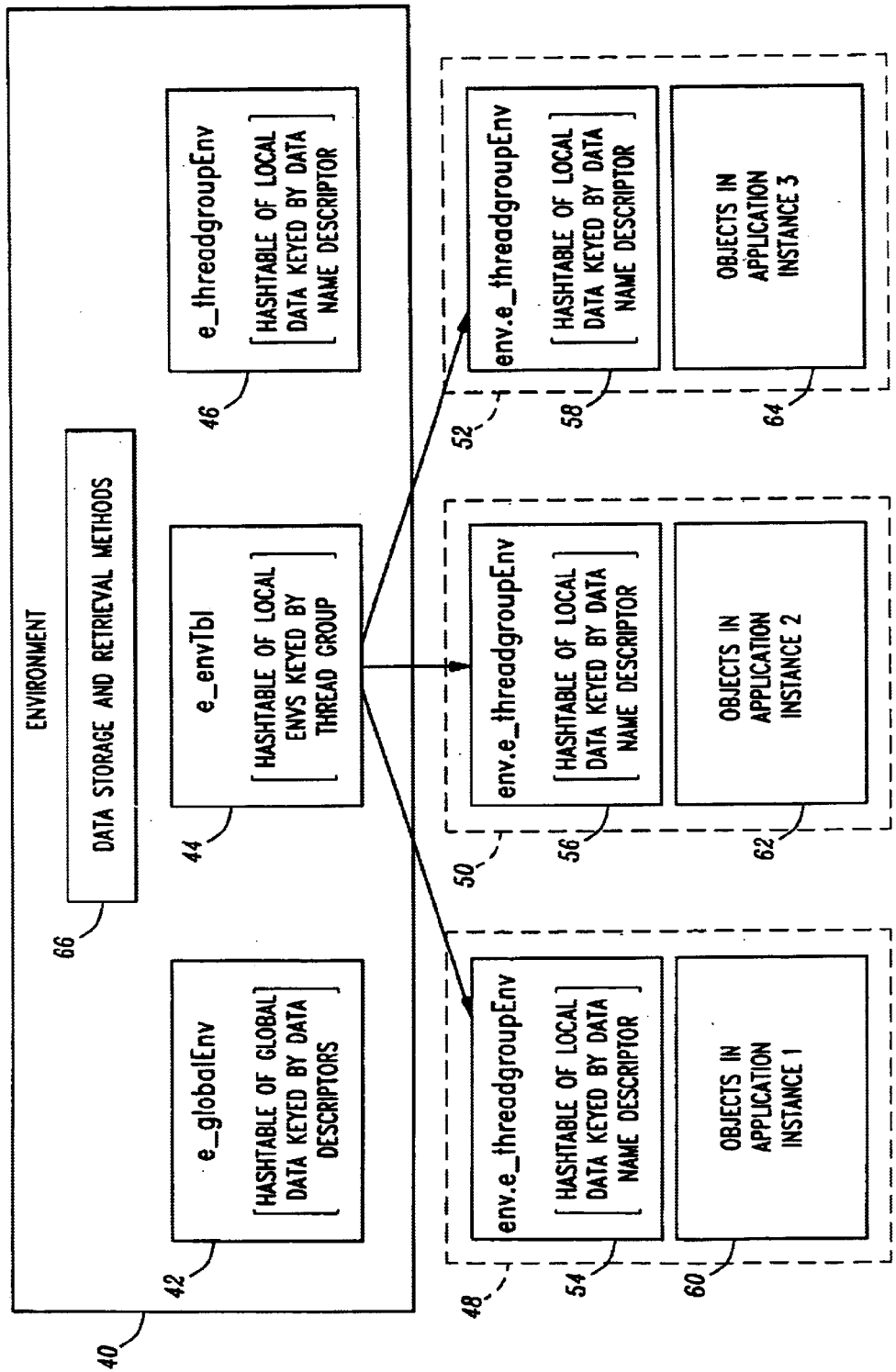
FIG. 5 is a block diagram showing a global data sharing environment managing local data sharing environments for multiple instances of application object groups in the object oriented processing system of FIG. 3.

Turning now to FIG. 5, the Env class from which the hash table 30 was created is illustrated as a global environment Env 40. Env 40 provides data storage and retrieval services on behalf of application instances 48, 50 and 52. It contains hash tables e_globalEnv 42, e_envTbl 44 and e_threadGroupEnv 46. The e_globalEnv hash table 42 is a static hash table of global variables (global data table) to which all application instances have access and which can be used for sharing data therebetween. The hash table e_threadGroupEnv 46 is a non-static hash table template of local data keyed by data name descriptors. The hash table e_envTbl 44 is a static global hash table that is keyed by thread group identifiers and whose elements can either be references to local env objects 54, 56 and 58, or the objects themselves. As such, the hash table e_envTbl 44 is a "hash table of hash tables." Each of the local env objects is an instantiation of the Env 40 that contains a local env.e_threadGroupEnv hash table of local data (or references thereto) keyed by data name descriptors. The local env.e_threadGroupEnv hash table for env 54 provides a data storage and retrieval mechanism for the group of objects referenced by numeral 60 in the first application instance. Similarly, for the second and third application instances, the local env.e_threadGroupEnv hash tables for envs 56 and 58 provide data storage and retrieval for object groups 62 and 64, respectively.

Env 40 also contains data storage and retrieval methods 66 that object groups 60, 62 and 64 call in order to store and retrieve data variables relative to their local environments. The steps for each of these methods are depicted in the flow diagrams in FIGS. 6–8. Advantageously, the transfer of data to and from the local environments is performed transparently and without knowledge thereof by the application instance objects. As far as each application instance is concerned, there is only a single static environment dedicated to that application instance and which is accessible via a standard set of environment method calls. Unbeknownst to the application instances, the global Env 40 responds to the method calls from objects in each application instance by accessing the application instance's local env 54, 56 or 58. The global Env 40 thus acts as a data sharing proxy agent on behalf of requesting objects. As part of this proxy agent function, and as described in more detail below, Env 40 identifies the calling object and its local environment using the object's thread group identifier. Other identifying features might also be used, as will be appreciated by persons skilled in the art.

Figure 6:
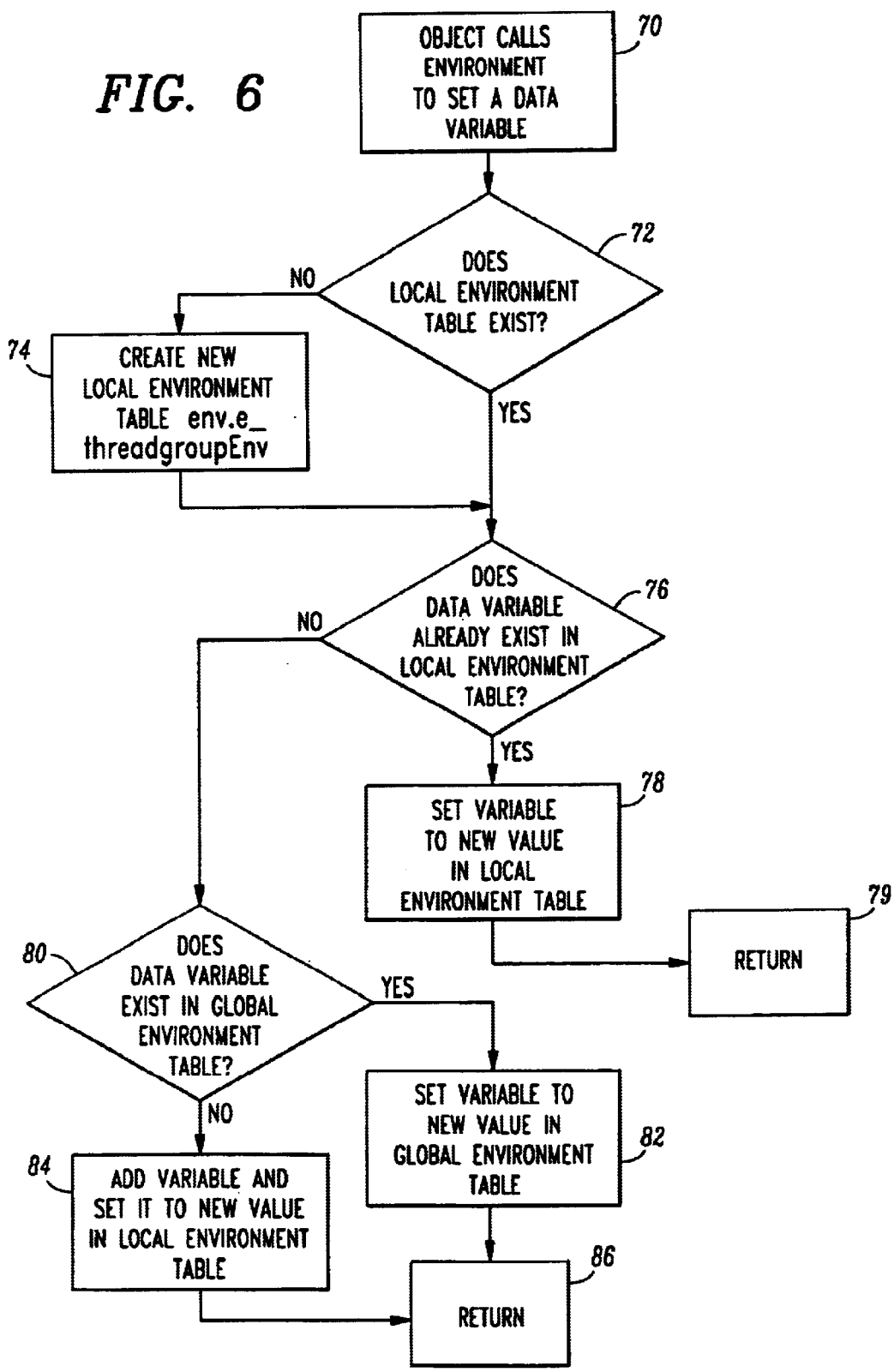
FIGS. 6–8 are flow diagrams showing method steps performed in accordance with the invention to implement the data sharing environment of FIG. 5.

Turning now to FIG. 6, the actions resulting from a call in step 70 to a method that either creates a data variable or changes an existing one are shown. This method shall be referred to as the "setVar" method. It is a static method and thus belongs to the Env 40 class. As is shown in FIG. 6, setVar first performs a check in step 72 for the existence of a local env.e_threadGroupEnv table corresponding to the calling object. Such a table is created in step 74 if it does not already exist. The method for creating the local environment is described below in connection with FIG. 7. The initial setVar calling and table check, as described relative to steps 70 and 72, may be implemented with the following Java commands:

```
public static synchronized boolean setVar(Object key,
    Object def)
{
    return(setVar(key,def,e_dfltProperty));
}
/**
```

"setVar( )" creates a variable in the local environment of the ThreadGroup if the named variable does not exist either in the local or global environment. "setVar( )" insures that a local environment exists before anything else is done, hence the first call to "setVar( )" performs a "createEnv( )" call for the ThreadGroup if it has not been done already. "setVar( )" overwrites an existing variable if the variable already exists. It operates preferentially on the local environment.

```
*/
public static synchronized boolean setVar
(
Object key,
Object def,
VarPropertiesEnum props
)
{
    // Insure that a local environment exists before attempt-
        ing to
    // set a variable.
    Env env=getEnv( );
    if (env==null)
    {
        if (createEnv( )==false)
            return(false);
        env=getEnv( );
    }
}
```

The getEnv( ) method, which calls createEnv( ), uses the calling object's thread group identifier to find the local environment, as the following Java code indicates:

```
public static Env getEnv( )
{
    if (e_envTbl==null)
        createEnv( );
    ThreadGroup tg=Thread.currentThread( ).
        getThreadGroup( );
    Env env=(Env)e_envTbl.get(tg);
    return(env);
}
```

As is shown in step 76, after ensuring that a local environment table exists, setVar tests if the variable already exists in the local env.e_threadGroupEnv table. If the variable does exist in the local env.e_threadGroupEnv table, then the existing variable is overwritten in step 78. If the variable does not exist in the local environment, the setVar method checks if it exists in the global environment table e_globalEnv 42, as is shown in step 80. If the variable does exist in the global environment table e_globalEnv 42, then the existing variable is overwritten with the new value in step 82. If the variable does not exist in the local or global environment, setVar creates it in the local environment in step 84. The aforementioned tests for the existence of the variable in the local and global environments and the subsequent setting of the variable, as described relative to steps 76–84, may be implemented using the following Java commands:

```
// Does the variable already exist in the local environ-
    ment?
// If so, change it there.
if (env.e_threadGroupEnv.getVar(key) !=null)
    return(env.e_threadGroupEnv.setVar(key,def,props));
// If the variable doesn't exist in the local environment,
// but does exist in the global environment, change it in
// the global environment.
else if (e_globalEnv.getVar(key) !=null)
    return(e_globalEnv.setVar(key,def,props));
// If the variable doesn't exist either place, create it in
// the local environment.
else
    return(env.e_threadGroupEnv.setVar(key,def,props));
}
```

Figure 7:
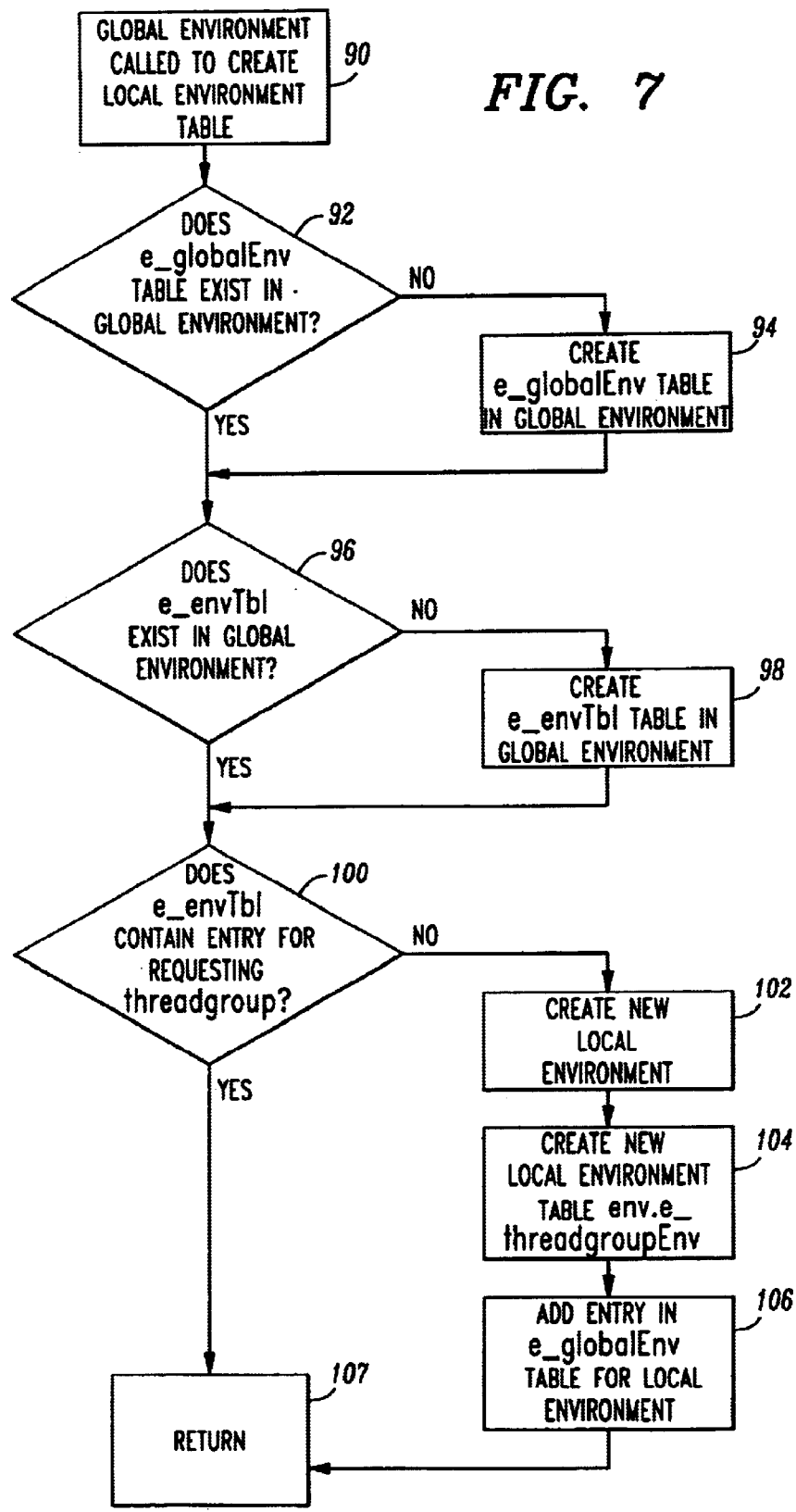

Turning now to FIG. 7, a flow diagram corresponding to step 74 in FIG. 6 is shown with actions invoked by a method call in step 90. This method creates a local environment table and shall be referred to as the "createEnv" method. As is shown in step 92 of FIG. 7, createEnv first checks for the existence of the static global hash table, e_globalEnv 42. If this hash table does not already exist, createEnv creates it in step 94. Similarly, step 96 performs a test for the existence of the static global hash table, e_envTbl 44 and step 98 creates the table if it does not already exist. These checks and the creation of the static global tables as described relative to steps 92–98 may be implemented with the following Java commands:

```
// Create your own environment based on your own Thread-
    Group
public static synchronized boolean createEnv( )
{
    return(createEnv((EnvOptionsEnum)null,
        Thread.currentThread( ).getThreadGroup( )));
}
public static synchronized boolean createEnv
    (EnvOptionsEnum opts)
{
    ThreadGroup tg=Thread.currentThread( ).
        getThreadGroup( );
    return(createEnv(opts,tg));
}
public static synchronized boolean createEnv
(
EnvOptionsEnum opts,
ThreadGroup tg
)
{
    if (opts==null)
    {
        opts=EnvOptionsEnum.defaultValue( );
    }
    if (e_globalEnv==null)
        e_globalEnv=new VariablesCache( );
    if (e_envTbl==null)
        e_envTbl=new Hashtable( );
```

As is shown in step 100, createEnv continues with a test to determine if e_envTbl 44 contains a local environment table entry for the thread group identifier that was passed to createEnv as an argument. If e_envTbl 44 has no such entry, the method creates a new local environment in step 102, creates a new local environment table env.e_threadGroupEnv (e.g., 54, 56 or 58) in step 104, and finally puts the new local environment table entry into e_envTbl 44 in step 106. The createEnv method returns to the calling object in step 107. The check for the table associated with the key, the creation of a new local environment table entry, and the return to the calling object, as described relative to steps 100–107, may be implemented by using the following Java commands:

```
if (e_envTbl.containsKey(tg)==false)
    {
    Env localEnv=new Env( );
    localEnv.e_threadGroupEnv=new Variables
        Cache( );
    localEnv.e_envFlags=opts;
    e_envTbl.put(tg,localEnv);
    return(true);
    }
return(false);
}
```

Figure 8:
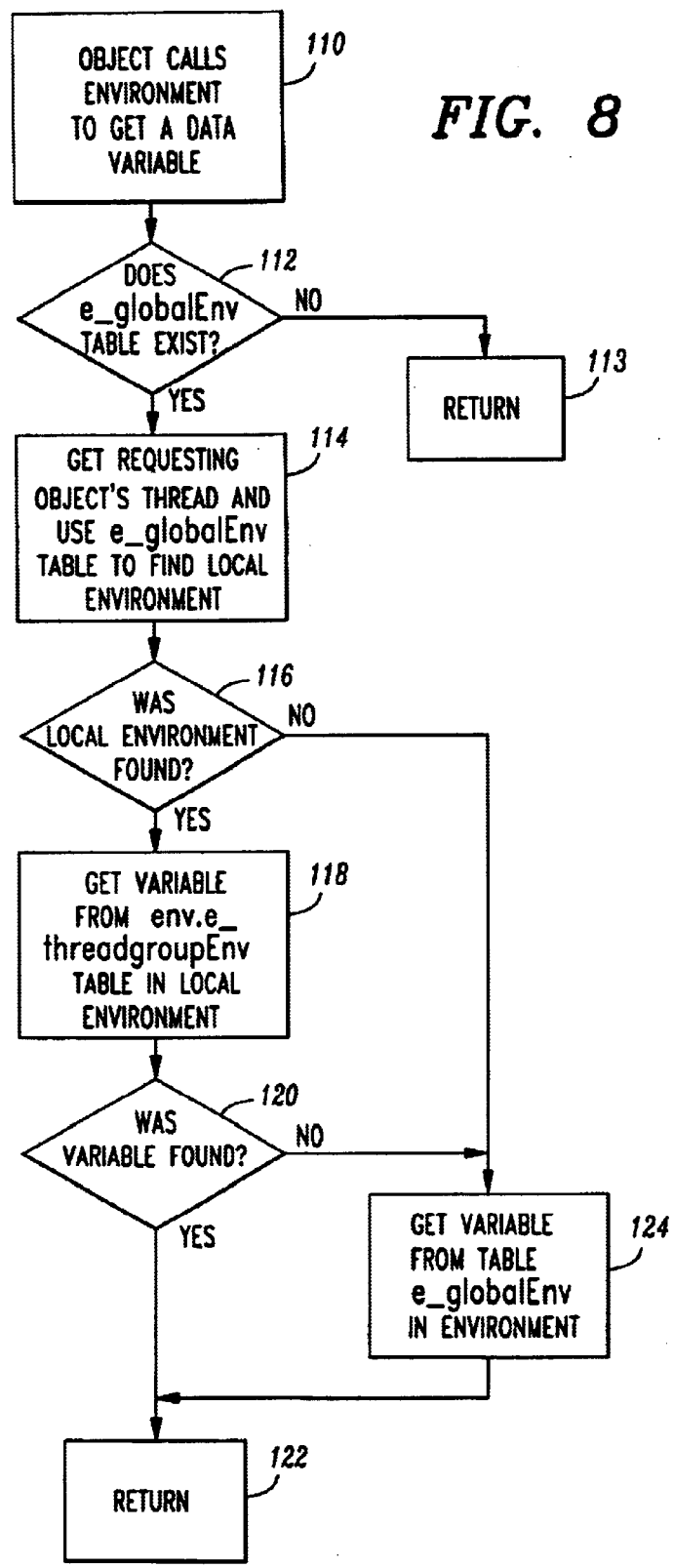

Turning now to FIG. 8, a flow diagram for retrieving data is shown with actions invoked by a method call in step 110. This method retrieves the data associated with a specific data identifier key and shall be referred to as the "getVar" method. As is shown in step 112 of FIG. 8, getVar first determines whether the hash table e_globalEnv 42 exists. If this table does not exist, a null value is returned immediately in step 113. If, however, e_globalEnv 42 does exist, step 114 accesses the calling object's thread group identifier and attempts to retrieve the local environment from e_envTbl 44 using the thread group identifier as the key. If the local environment was found based on the test in step 116, the getVar method attempts to retrieve the variable from the calling object's local hash table env.e_threadGroupEnv in step 118. If the variable was found after testing therefor in step 120, the variable is returned in step 122. If the local environment was not found in step 116, or if the variable was not found in step 120, the getVar method tries to retrieve the variable from the global environment in step 124. These steps 112–124 for using a specified key to get a local or global version of a variable may be implemented with the following Java commands:

```
public static synchronized Object getVar(Object key)
{
    // If there is no hash table of global variables, getVar
    // returns a null value.
    if (e_globalEnv==null)
        return(null);
    // Attempt to retrieve the variable from the local hash
        table
    // env.e_threadGroupEnv using the specified key.
    Object ans=getLocalVar(key);
    // If there was no local hash table or if the variable was
    // not found in the local environment, attempt to
        retrieve
    // the variable from the global hash table e_globalEnv
        using
    // the specified key.
    if (ans==null)
        ans=getGlobalVar(key);
    // The final answer is a null value if the variable was
    // not found in env.e_threadGroupEnv or
        e_globalEnv.
    // Otherwise, the returned answer is the variable of
        interest.
    return(ans);
} public static synchronized Object getLocalVar(Object
    key)
{
    // If there is no hash table of global variables, getLo-
        calVar
    // returns a null value.
    if (e_globalEnv==null)
        return (null);
    Object ans=null;
    // Retrieve the current code's ThreadGroup and then
        look up
    // the local hash table of variables keyed on the Thread-
        Group.
    ThreadGroup tg=Thread.currentThread( ).
        getThreadGroup( );
    Env env=(Env)e_envTbl.get(tg);
    // If there is a local hash table env.e_threadGroupEnv
    // keyed on the ThreadGroup, attempt to retrieve the
        variable
    // from that hash table.
    if (env !=null)
        ans=env.e_threadGroupEnv.getVar(key);
    return(ans);
}
public static synchronized Object getGlobalVar(Object
    key)
{
    // If there is no hash table of global variables, getGlo-
        balVar
    // returns a null value.
    if (e_globalEnv==null)
        return(null);
    // Attempt to retrieve the variable from the hash table of
    // global variables.
    return(e_globalEnv.getVar(key))
}
```

Accordingly, an object oriented processing system and data sharing environment for applications running therein has been described. While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In an object oriented processing system including one or more applications executing therein, a data sharing method for sharing data among objects in separate instances of said application(s), comprising the steps of:

creating a local hash table for each of said application instances, the storage locations of said local hash tables storing or referencing data to be shared among the objects of a corresponding one of said application instances, said data being keyed by data identifiers that are maintained in the key indexes of said local hash tables;

creating a global hash table, the storage locations of said global hash table containing or referencing said local hash tables, said local hash tables being keyed by application instance identifiers which indicate the application instances' thread groups and that are maintained in the key index of said global hash table;

in response to an object in one of said application instances making a data sharing, comprising storage or retrieval, request using one of said data identifiers as a key, determining an application instance identifier corresponding to the application instance to which said requesting object belongs;

querying said global hash table using said application instance identifier as a key to identify the local hash table corresponding to the application instance to which said requesting object belongs; and querying said identified local hash table using said data identifier as a key to perform said data sharing request.

2. A method in accordance with claim 1 wherein said step of creating a local hash table is implemented in response to an object in an application instance making a data storage request and a determination that no local hash table for said application instance yet exists, and storing said local hash table in said global hash table.

3. A method in accordance with claim 2 wherein said storing step includes adding said local hash table along with a corresponding application instance identifier to said global hash table.

4. A method in accordance with claim 3 wherein said step of creating a global hash table is implemented in response to an object in an application instance making a data storage request and a determination that no global hash table yet exists.

5. A method in accordance with claim 4 further including creating a global data table for passing data between application instances.

6. A method in accordance with claim 5 wherein application data retrieval requests are processed by retrieving data from said global data table if said data is not found in a corresponding local hash table or if no such local hash table exists.

7. A method in accordance with claim 5 wherein application storage requests are processed by storing data in a corresponding local hash table if a previous version of said data exists therein, or in said global data table if a previous version of said data exists therein but not in said local hash table, or in said local hash table if no prior version of said data exists therein or in said global data table.

8. A method in accordance with claim 1 wherein said step of determining an application instance identifier includes setting said application instance identifier to an application instance thread group identifier corresponding to said requesting object.

9. A method in accordance with claim 1 wherein said step of querying said global hash table includes identifying said local hash table using an application thread group identifier as said key.

10. In an object oriented processing system, including one or more applications executing therein, a data sharing system for sharing data among objects in separate instances of said application(s), comprising:

a local hash table for each of said application instances, the storage locations of said local hash tables storing or referencing data to be shared among the objects of a corresponding one of said application instances, said data being keyed by data identifiers that are maintained in the key indexes of said local hash tables;

a global hash table, the storage locations of said global hash table containing or referencing said local hash tables, said local hash tables being keyed by application instance identifiers which indicate the application instances' thread groups and that are maintained in the key index of said global hash table;

means, responsive to an object in one of said application instances making a data sharing, comprising storage or retrieval, request using one of said data identifiers as a key, for determining an application instance identifier corresponding to the application instance to which said requesting object belongs;

means for querying said global hash table using said application instance identifier as a key to identify the local hash table corresponding to the application instance to which said requesting object belongs; and means for querying said identified local hash table using said data identifier as a key to perform said data sharing request.

11. A system in accordance with claim 10 wherein said local hash table is implemented in response to an object in an application instance making a data storage request and a determination that no local hash table for said requesting application instance yet exists, and storing said local hash table in said global hash table.

12. A system in accordance with claim 11 wherein said storage of said local hash table includes adding said local hash table along with a corresponding application instance identifier to said global hash table.

13. A system in accordance with claim 12 wherein said global hash table is implemented in response to an object in an application instance making a data storage request and a determination that no global hash table yet exists.

14. A system in accordance with claim 13 further including a global data table for passing data between application instances.

15. A system In accordance with claim 14 wherein application data retrieval requests are processed by retrieving data from said global data table if said data is not found in a corresponding local hash table or if no such local hash table exists.

16. A system in accordance with claim 14 wherein application storage requests are processed by storing data in a corresponding local hash table if a previous version of said data exists therein, or in said global data table if a previous version of said data exists therein but not in said local hash table, or in said local hash table if no prior version of said data exists therein or in said global data table.

17. A system in accordance with claim 10 wherein said means for determining an application instance identifier includes means for setting said application instance identifier to an application instance thread group identifier corresponding to said requesting object.

18. A system in accordance with claim 10 wherein said means for querying said global hash table includes means for identifying said local hash table using an application thread group identifier as said key.

19. In an object oriented processing system including one or more applications executing therein, a data sharing method for sharing data among objects in separate instances of said application(s), comprising:

creating a local table In a local environment of each of said application instances, the storage locations of said local tables storing or referencing data to be shared among the objects of a corresponding one of said application instances;

creating a global table in a global environment shared by said application instances, the storage locations of said global table containing or referencing said local tables, said local tables being keyed by their corresponding application instances which indicate the application instances' thread groups;

in response to an object in one of said application instances making a data sharing, comprising storage or retrieval, request for one of said shared or referenced data, determining an application instance to which said requesting object belongs;

querying said global table using said determined application instance to identify the local table corresponding to the determined application instance; and querying said identified local table for the one of said stored or referenced data to perform said data sharing request.

20. A method in accordance with claim 19 further comprising:

creating a global data table in the global environment for passing data between application instances;

in response to an object in one of said application instances making a data sharing request for a datum, determining an application instance to which said requesting object belongs;

querying said global table using said determined application instance to identify the local table corresponding to the determined application instance;

querying said identified local table for the datum to perform said data sharing request; and in response to failure of said querying of said identified local table, querying said global data table for the datum to perform said data sharing request.

21. A method in accordance with claim 20 wherein:

said step of creating a local table is effected in response to an object in an application instance making a data storage request and a determination that no local table for said application instance yet exists, and storing or referencing said local table in said global table;

said step of creating a global table is effected in response to an object in an application instance making a data storage request and a determination that no global table yet exists; and said step of creating a global data table is effected in response to an object in an application instance making a data storage request and a determination that no global data table yet exists.

22. A method in accordance with claim 20 wherein:

said data sharing request for a datum comprises a data storage request for said datum; and the method further comprises
in response to failure of said querying of said global data table for the datum, creating or referencing the datum in the identified local table.

23. A method in accordance with claim 20 wherein:

said data sharing request for a datum comprises a data retrieval request for said datum; and the method further comprises
in response to failure of said querying of said global table, querying said global data table for the datum to perform said data retrieval request.

24. In an object oriented processing system including one or more applications executing therein, a data sharing system for sharing data among objects in separate instances of said application(s), comprising:

a local table in a local environment of each of said application instances, the storage locations of said local tables storing or referencing data to be shared among the objects of a corresponding one of said application instances;

a global table in a global environment shared by said application instances, the storage locations of said global table containing or referencing said local tables, said local tables being keyed by their corresponding application instances which indicate the application instances' thread groups;

means, responsive to an object in one of said application instances making a data sharing, comprising storage or retrieval, request for one of said stored or referenced data, for determining an application instance to which said requesting object belongs;

means for querying said global table using said determined application instance to identify the local table corresponding to the determined application instance; and means for querying said identified local table for the one of said stored or referenced data to perform said data sharing request.

25. A system in accordance with claim 24 further including:

a global data table in the global environment for passing data between application instances;

means responsive to an object in one of said application instances making a data sharing request for a datum, for determining an application instance to which said requesting object belongs;

means for querying said global table using said determined application instance to identify the local table corresponding to the determined application instance;

means for querying said identified local table for the datum to perform said data sharing request; and means responsive to failure of said querying of said identified local table, for querying said global data table for the datum to perform said data sharing request.

26. A system in accordance with claim 25 wherein:

said local table is implemented in response to an object in an application Instance making a data storage request and a determination that no local table for said application instance yet exists, and storing or referencing said local table in said global table;

said global table is implemented in response to an object in an application Instance making a data storage request and a determination that no global table yet exists; and said global data table is implemented in response to an object in an application instance making a data storage request and a determination that no global data table yet exists.

27. A system in accordance with claim 25 wherein:

said data sharing request for a datum comprises a data storage request for said datum; and the system further comprises
means responsive to failure of said querying of said global data table for the datum, for creating or referencing the datum in the identified local table.

28. A system in accordance with claim 25 wherein:

said data sharing request for a datum comprises a data retrieval request for said datum; and the system further comprises
means responsive to failure of said querying of said global table, for querying sad global data table for the datum to perform said data retrieval request.

* * * * *